US012001984B2

(12) United States Patent
Boddu et al.

(10) Patent No.: US 12,001,984 B2
(45) Date of Patent: Jun. 4, 2024

(54) ENHANCED USER SELECTION FOR COMMUNICATION WORKFLOWS USING MACHINE-LEARNING TECHNIQUES

(71) Applicant: Oracle International Corporation, Redwood Shores, CA (US)

(72) Inventors: Navin Chand Boddu, Pleasanton, CA (US); Venkata Chandrashekar Duvvuri, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 35 days.

(21) Appl. No.: 16/728,701

(22) Filed: Dec. 27, 2019

(65) Prior Publication Data

US 2021/0201237 A1 Jul. 1, 2021

(51) Int. Cl.
| | |
|---|---|
| *G06Q 10/0631* | (2023.01) |
| *G06F 18/23* | (2023.01) |
| *G06N 5/04* | (2023.01) |
| *G06N 20/00* | (2019.01) |
| *G06Q 10/0639* | (2023.01) |
| *G06Q 30/0251* | (2023.01) |

(52) U.S. Cl.
CPC ....... *G06Q 10/06316* (2013.01); *G06F 18/23* (2023.01); *G06N 5/04* (2013.01); *G06Q 10/06398* (2013.01); *G06Q 30/0269* (2013.01); *G06N 20/00* (2019.01)

(58) Field of Classification Search
CPC combination set(s) only.
See application file for complete search history.

(56) References Cited

U.S. PATENT DOCUMENTS

| | | | |
|---|---|---|---|
| 8,655,695 B1 | 2/2014 | Qu et al. | |
| 8,819,055 B2 * | 8/2014 | Rangaswamy | G06Q 10/10 707/769 |
| 10,691,664 B1 * | 6/2020 | Yap | G06F 16/23 |
| 2016/0071162 A1 | 3/2016 | Ogawa et al. | |

(Continued)

FOREIGN PATENT DOCUMENTS

| | | | | |
|---|---|---|---|---|
| CA | 2619667 A1 * | 11/2000 | | G06Q 30/02 |
| CA | 3104137 A1 * | 1/2020 | | G06F 16/287 |

(Continued)

OTHER PUBLICATIONS

T.-P. Pham, J. J. Durillo and T. Fahringer, "Predicting Workflow Task Execution Time in the Cloud Using a Two-Stage Machine Learning Approach," in IEEE Transactions on Cloud Computing, vol. 8, No. 1, pp. 256-268, Jan. 1-Mar. 2020, doi: 10.1109/TCC. 2017.2732344. (Year: 2020).*

(Continued)

*Primary Examiner* — Crystol Stewart
(74) *Attorney, Agent, or Firm* — Mughal Gaudry & Franklin PC

(57) ABSTRACT

The present disclosure relates to systems and methods for intelligently selecting users for inclusion in workflows. In some examples, machine-learning techniques can be executed to intelligently expand the set of user profiles included in a workflow. The intelligent selection of new user profiles may be continuously performed over time intervals, thereby enhancing the computational efficiency and accuracy of expanding the user profiles selected for inclusion in the workflow.

18 Claims, 8 Drawing Sheets

(56) References Cited

U.S. PATENT DOCUMENTS

| | | | |
|---|---|---|---|
| 2016/0125456 A1 | 5/2016 | Wu et al. | |
| 2016/0140627 A1 | 5/2016 | Moreau et al. | |
| 2016/0335260 A1* | 11/2016 | Convertino | G06F 16/2358 |
| 2017/0140283 A1* | 5/2017 | Cheng | G06N 20/00 |
| 2017/0330239 A1 | 11/2017 | Luo et al. | |
| 2019/0139079 A1 | 5/2019 | Nataf | |
| 2019/0354993 A1* | 11/2019 | Ben-Or | G06N 20/20 |
| 2020/0134510 A1* | 4/2020 | Basel | G06F 16/285 |
| 2020/0193321 A1* | 6/2020 | Shao | G06N 20/00 |
| 2020/0302486 A1* | 9/2020 | Ayoub | G06N 20/00 |
| 2020/0342006 A1* | 10/2020 | Rossi | G06F 16/28 |
| 2021/0014252 A1* | 1/2021 | Usher | H04L 63/1416 |
| 2021/0118035 A1* | 4/2021 | Misawa | G06Q 30/0255 |
| 2022/0004954 A1* | 1/2022 | Rafferty | G06Q 10/06316 |
| 2022/0414533 A1* | 12/2022 | Mohanty | G06N 20/00 |

FOREIGN PATENT DOCUMENTS

| | | | | |
|---|---|---|---|---|
| EP | 3644241 A1 * | 4/2020 | | G01C 23/005 |
| WO | WO-2018088276 A1 * | 5/2018 | | G06Q 30/02 |

OTHER PUBLICATIONS

M. M. Kumar et al., "Driving E-commerce Success with Advanced Machine Learning: Customer Purchase Pattern Insights," 2023 International Conference on Sustainable Communication Networks and Application (ICSCNA), Theni, India, 2023, pp. 1196-1203 (Year: 2023).*

"About Remarketing", Google, Available Online at: https://support.google.com/google-ads/answer/2453998, retrieved Oct. 8, 2019, 3 pages.

"About Similar Audiences on the Display Network", Google, Available Online at: https://support.google.com/google-ads/answer/2676774?hl=en, retrieved Oct. 8, 2019, 5 pages.

"The Future of Audience Selection: Where AI Can Take Your Campaigns", Marketo, Available Online at: https://blog.marketo.com/2018/04/future-audience-selection-ai-can-take-campaigns.html, accessed from internet on Sep. 19, 2019, 3 pages.

"Urban Airship Introduces AI Marketing Orchestration to Optimize Customer Engagement for Businesses Across the Martech Stack", Urban Airship, Available Online at: https://www.globenewswire.com/news-release/2018/01/25/1305027/0/en/Urban-Airship-Introduces-AI-Marketing-Orchestration-to-Optimize-Customer-Engagement-for-Businesses-Across-the-Martech-Stack.html, Jan. 25, 2018, 4 pages.

Kothari; Neel, "Audience Selection Using Artificial Intelligence with Connex®", Audience Selection fron Rise Interactive, Available Online at: https://www.riseinteractive.com/blog/audience-selection-using-artificial-intelligence, Sep. 22, 1017, 6 pages.

Liu et al., "Audience Expansion for Online Social Network Advertising", Proceedings of the 22nd ACM SIGKDD International Conference on Knowledge Discovery and Data Mining, Aug. 13-17, 2016, 10 pages.

Liu et al., "Finding the Right Consumer: Optimizing for Conversion in Display Advertising Campaigns", Proceedings of the Fifth International Conference on Web Search and Web Data Mining, Feb. 8-12, 2012, 10 pages.

Taulli, Tom, "How AI Will Change B2B Marketing Forever", Forbes, Available Online at: https://www.forbes.com/sites/tomtaulli/2019/04/06/how-ai-will-change-b2b-marketing-forever/#3bf8eb0118cd, Apr. 6, 2019, 3 pages.

* cited by examiner

400A
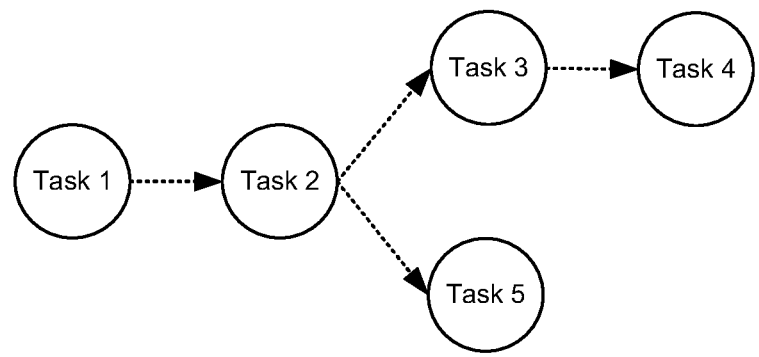
FIG. 4A
400B
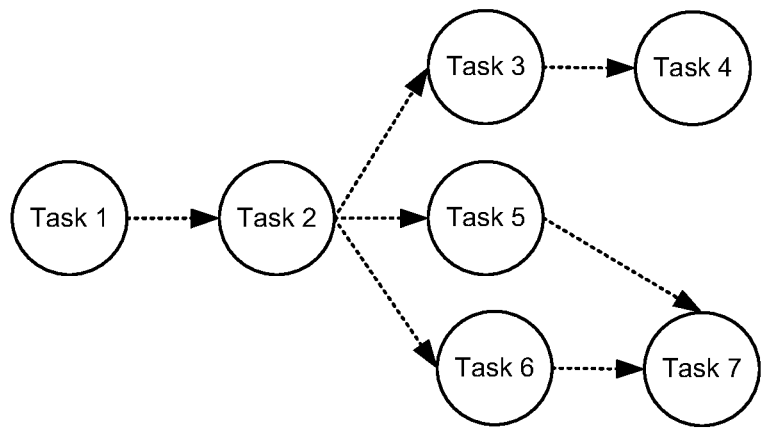
FIG. 4B
FIG. 4

ENHANCED USER SELECTION FOR COMMUNICATION WORKFLOWS USING MACHINE-LEARNING TECHNIQUES

TECHNICAL FIELD

The present disclosure generally relates to systems and methods for intelligently selecting users for inclusion in workflows. More particularly, the present disclosure relates to systems and methods for automatically evaluating the performance of a first set of users interacting with tasks of a workflow, and intelligently selecting a second set of users for inclusion in the workflow using predictions generated by machine-learning models.

BACKGROUND

Workflows may include multiple tasks designed to trigger the transmission of communications to users at certain times. For example, a task may be executable code designed to trigger one or more communications to a user over a communication channel at a given time. Multiple tasks may be coordinated in a workflow to engage individual users. In some approaches, the users selected for engagement by the workflow tasks are often manually selected and refined based on certain criteria. In other approaches, users are selected for engagement by a workflow based on audience segmentation. For example, a group of users may be segmented based on various criteria. A task may be designed to engage with members of a segment. The segmenting criteria, however, is often created without the context of the coordinated sequence of tasks in the workflow. The various approaches to select users for engagement by workflows are inefficient and computationally burdensome.

SUMMARY

Certain aspects and features of the present disclosure relate to systems and methods for intelligently selecting users for engagement by workflows. Intelligently selecting users for engagement by workflows may include selecting a first set of users for engagement by executing one or more tasks of a workflow. Executing a task of a workflow may include transmitting a communication (e.g., a digital message) to a user device over a communication channel. For example, a task may include transmitting an email to a user's email address. As another example, a task may include transmitting a text message (e.g., Short Message Service (SMS)) to a user's mobile device. A cloud-based application may collect performance metrics in real-time as the executed tasks of a workflow transmit communications to individual user devices. For example, the performance metrics may indicate a performance associated with a target objective or action available to perform by the user in response to receiving the communication. Receiving a communication at a user device may enable the user operating the user device to perform an action (e.g., tap, click, select, or otherwise open a link). The action selected by the user may be transmitted to the cloud-based application for further analysis. The cloud-based application may generate performance metrics for the first set of users based on the received signals from the various users engaged by the tasks of the workflow. For example, a performance metric may be based on a target action. The performance metric is favorable (e.g., above a threshold) if the user performed the target action (e.g., selecting a link included in the communication) in response to receiving the communication at the user device. Conversely, the performance metric may be unfavorable (e.g., below the threshold) if the user did not perform the target action in response to receiving the communication at the user device. A performance of the first set of users over a time interval may be determined based on the collected performance metrics. The cloud-based application may evaluate the performance metrics of the first set of users to select a first subset of the first set of users. For example, the users selected in the first subset of users may each be associated with a performance metric above a threshold or that corresponds to a target action (e.g., the users in the first subset performed the action of selecting a link in response to receiving the communication triggered by executing the task).

The users in the first set of users received a communication when a task of the workflow was executed. The users in the first set of users that performed a target action (e.g., selected a link included in the communication) may be grouped together into a first subset of the first set of users. The users in the first subset may correspond to users associated with a performance metric above a threshold or corresponding to the target action. The cloud-based application may access a second set of users. The second set of users may not be included in the workflow, and thus, the second set of users would not have received communications when a task of the workflow was executed. The cloud-based application may execute a user modeling protocol to automatically and intelligently select users from the second set of users for inclusion into the workflow. Executing the user modeling protocol may include generating predictions of which users from the second set (e.g., users who have not engaged with the workflow) would perform the target action. A result of executing the user modeling protocol may expand the users selected for inclusion into the workflow in an intelligent, scalable, and computationally intelligent manner. Additionally, the performance of the first set or user and/or the second set of users may be evaluated to determine the selection of a third set of users, and so on.

Further, executing the user modeling protocol may include identifying a group of users from the second set that are similar to the first subset of users who performed the target action. Determining that two or more users are similar may include evaluating the user features of both users (e.g., one user from the set of second users and the other user from the first subset of users who performed the target action). Non-limiting examples of techniques executed for determining similarity between two or more users include statistical inference algorithms (e.g., curve fitting), unsupervised machine-learning techniques (e.g., clustering techniques, such as k-means clustering), supervised machine-learning techniques, and other suitable audience lookalike techniques. The user modeling protocol may result in the selection of a second subset of the second set of users. The selected second subset of users may each be determined to be similar to the first subset of users based on the result of the user modeling protocol. The cloud-based application may intelligently expand the users included in the workflow by including the second subset of users into the workflow. Executing a task of the workflow in association with the second subset of users includes generating and transmitting a communication to a user device associated with a user of the second subset. In some implementations, the second subset of users may be added onto the first set of users and included in the workflow. In other implementations, the second subset of users may replace the first set of users in the workflow. The cloud-based application may continue to collect performance metrics on the users included in the workflow and perform the user modeling protocol to select a group of new users (e.g., users who have not yet been included in the workflow) predicted to perform the target action or an associated action if included in the workflow. As a technical advantage, new users for a given workflow are intelligently selected from users who have not interacted with the workflow. The new users are selected based on performance metrics and a prediction of which users would likely perform a target action.

In some implementations, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including: accessing a first user data set (e.g., input list of users) representing a first set of user devices (e.g., the actual computing devices of the users in the input list) and a second user data set (e.g., the list of users from which the similar users are identified and selected) representing a second set of user devices (e.g., the actual devices of the similar users). The computer-implemented method also includes inputting the first user data set into a workflow including one or more tasks, each task of the one or more tasks including transmitting a communication to a user device, and the workflow being configured to execute the one or more tasks in a sequence (e.g., a single or cross channel orchestration). The computer-implemented method also includes executing the one or more tasks of the workflow in association with the first set of user devices, the execution including transmitting the communication to each user device of the first set of user devices, where receiving the communication at a user device enables the user device to perform one or more actions; receiving one or more performance metrics associated with the execution of the one or more tasks of the workflow during a time period (e.g., collected performance metrics during an iteration), each performance metric of the one or more performance metrics indicating an action of the one or more actions performed by a user device in response to receiving the communication; automatically selecting a first subset (e.g., best performing audience) of the first set of user devices, the selection of the first subset being based on the one or more performance metrics associated with the first set of user devices (e.g., the users who clicked a link are included in the first subset of the best performing audience); performing a user modeling protocol (e.g., a user-similarity determination technique) using the first subset and the second set of user devices, the performance of the user modeling protocol resulting in a selection of one or more user devices of the second set of user devices into a second subset, and the selection of a user device into the second subset indicating that the selected user device is similar to a user device of the first subset; inputting at least a portion of the second user data set into the workflow, the portion of the second user data set corresponding to the second subset. The computer-implemented method also includes executing the one or more tasks of the workflow in association with the second subset, the execution of the one or more tasks including transmitting the communication to each user device of the second subset. Other embodiments of this aspect include corresponding computer systems, apparatus, and computer programs recorded on one or more computer storage devices, each configured to perform the actions of the methods.

Implementations may include one or more of the following features. The computer-implemented method where performing the user modeling protocol further includes: performing a clustering operation on the second user data set, where performing the clustering operation results of forming one or more clusters of user devices of the second set of user devices. The computer-implemented method may also include identifying a cluster of the one or more clusters that is similar to the first subset of the first set of user devices, the identification of the cluster similar to the first subset being based at least in part on one or more user features. The computer-implemented method where performing the user modeling protocol further includes executing one or more audience lookalike techniques. The computer-implemented method where performing the user modeling protocol further includes: executing a statistical inference technique to evaluate the first subset of the first set of user devices and the second set of user devices, the execution of the statistical inference technique resulting in a determining of one or more user devices of the second set of user devices that are similar to at least one user device of the first subset. The computer-implemented method where the one or more tasks of the workflow are not executed in association with the second set of user devices during the time period. The computer-implemented method where the automatic selection of the first subset includes selecting a user device into the first subset when the user device performed a target action (e.g., a click) of the one or more actions in response to receiving the communication. The computer-implemented method where the first user data set includes a plurality of first user records, each first user record of the plurality of first user records includes one or more user features characterizing a first user device of the first set of user devices, where the second user data set includes a plurality of second user records, each second user record of the plurality of second user records includes one or more user features characterizing a second user device of the second set of user device. Implementations of the described techniques may include hardware, a method or process, or computer software on a computer-accessible medium.

BRIEF DESCRIPTION OF THE DRAWINGS

The specification makes reference to the following appended figures, in which use of like reference numerals in different figures is intended to illustrate like or analogous components.

FIGS. 4A-4B are examples of different workflow, according to some aspects of the present disclosure.

DETAILED DESCRIPTION

Figure 1:
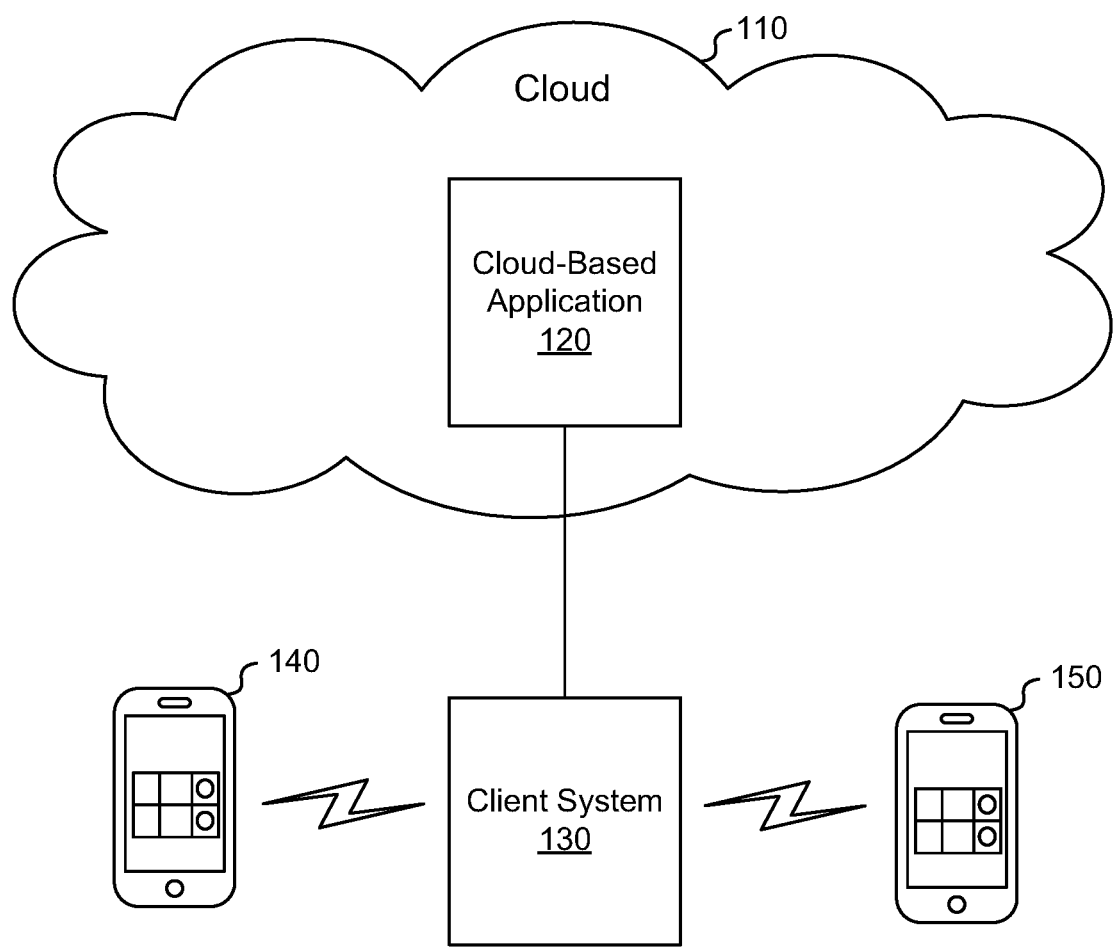
FIG. 1 is a block diagram illustrating an example of a network environment, according to some aspects of the present disclosure.

Cloud-based applications may include data management platforms hosted on cloud networks. Data management platforms may be configured to enable users to perform certain functionality on data records. For example, a data record may be a user profile that includes one or more data fields. A data field of a data record may include values that characterize a user associated with the user profile. The data field may be generated based on a previous interaction, such as an interaction between the user and a webpage. Workflows may be executed by a cloud-based application (or in some cases, by one or more servers external to the cloud network) to process certain data records. As a non-limiting example, a workflow (e.g., a marketing orchestration) may be configured to perform a coordinated sequence of one or more tasks (e.g., campaigns that engage users). A task, upon being executed by a server, may cause the server to transmit a communication over a communication channel to a user device associated with a user profile. The content of the communication and the communication channel selected to transmit the communication may be determined by the configuration of the task. Including a particular user profile in a workflow may cause the task included in the workflow to transmit a communication over a communication channel to a particular user device associated with the particular user profile. The task may define the type of communication channel selected for facilitating the transmission of the communication. Non-limiting examples of communication channels include SMS messaging, email, phone call, pop-up message while browsing a webpage, and other suitable communication channels. The scale of user profiles available for inclusion in workflows has increased to big-data levels (e.g., 20 million or more user profiles may be processed for a given processing task). Further, the complexity of individual user profiles has also increased. For example, a given user profile may include tens of thousands of data fields representing the various features or characteristics of the user profile. Thus, determining (in an automated manner) which user profiles to include in a workflow based on the data fields of the user profiles is a significant technical challenge, given the large scale and complexity of user profiles.

Certain implementations of the present disclosure include a cloud-based application configured to intelligently select user profiles from one or more sets of user profiles for inclusion in a workflow to expand the audience exposed to the tasks of the workflow. Being exposed to a task of a workflow may include a user device associated with a user profile receiving a communication over a communication channel, which is a result of executing the task in association with a user profile included in the workflow. Receiving a communication at a user device may enable the user operating the user device to perform one or more actions. As an illustrative example, the communication may be a text message including various content and a selectable link to additional content. A task may be executed, and as a result, the text message may be transmitted to a user device associated with a user profile. The text message enables the user to perform one or more actions, such as selecting the link and navigating to a certain webpage, not selecting the link, opening a message, purchasing a good or service after selecting the link, and other suitable actions. Intelligently selecting user profiles to include in a workflow may include selecting user profiles for which the corresponding user is predicted to perform one or more target actions. Selecting user profiles may include executing intelligent selection techniques to identify one or more users who are predicted to perform a target action in response to receiving the communication over a communication channel. At every time interval, a new group of user profiles may be selected for inclusion in the workflow (e.g., the corresponding users of the selected user profiles have not yet been included in the workflow, and thus, have not yet received a communication in response to a task being executed).

In some implementations, determining which user profiles to select for inclusion into a workflow may be based on a performance of one or more other users who were previously included in the workflow. For example, the cloud-based application may be configured to receive signals in real-time as users of user profiles included in the workflow perform an actions in response to receiving the communications. As a first user device receives a first communication in response to a task of the workflow being executed, the first user may perform an action, such as selecting a link included in the communication. As a second user device receives a second communication in response to the task of the workflow being executed (or in response to another task being executed), the second user may perform an action, such as not selecting a link included in the communication within a defined time period. The cloud-based application may receive a signal corresponding to an indication that the first user selected the link included in the communication. After the defined time period, the cloud-based application may receive a signal corresponding to an indication that the second user did not select the link included in the communication (or the cloud-based application may determine that the second user did not select the link because the defined time period has passed without receiving a signal indicating that the second user selected the link). The cloud-based application may continue to collect a data set associated with the responses of the various users who received communications as part of executing tasks of the workflow. After a time interval has passed, the cloud-based application may evaluate the performance metrics associated with the responses detected of the users who interacted with the workflow (e.g., the users who received a communication as part of executing a task of the workflow). The cloud-based application may select a group of users who performed above a threshold. For example, the cloud-based application may select the group of users, for which the corresponding signals received indicate that the user performed the target action, such as selecting the link included in the communication. The cloud-based application may then access a new set of user profiles, which have not yet been included in the workflow. The cloud-based application may perform a user modeling protocol to intelligently identify which user profiles of the new set of user profiles are similar to the group of users who performed above the threshold. In some examples, determining new user profiles (e.g., user profile that have not yet been included in the profile) who are similar to the user profiles performing above the threshold may include using machine-learning models or techniques to predict which new users are predicted to also perform the target action. As a result of executing the user modeling protocol, the cloud-based application may select a new group of users from the new set of users to include in the workflow. The above-noted process may continue until a terminal condition is satisfied. For example, a termination condition may be a number of time intervals that have passed, a convergence of the performance associated with the user profiles included in the workflow, or any suitable termination condition. Thus, certain embodiments enable the cloud-based application to intelligently select new user profiles for inclusion into a workflow based on the performance of a set of user profiles previously included in the workflow. As such, certain embodiments described herein provide a computationally efficient and dynamic process for selecting user profiles to include in workflows.

FIG. 1 is a block diagram illustrating an example of a network environment 100 for processing data records using a data management platform, such as cloud-based application 120. Cloud network 110 may be any cloud-based network that includes one or more cloud-based servers and one or more cloud-based databases. The one or more cloud-based servers of cloud network 110 may include at least one application server that hosts cloud-based application 120, along with at least one database server. For example, cloud-based application 120 may be a data management platform configured to perform functionality associated with one or more data sets of data records. In some implementations, a data record may represent a user profile that includes one or more data fields. Each data field of the one or more data fields may include a value that was generated in response to a user device interacting with a native application or web server during a previous interaction. For example, when a user device accesses a web server to load a webpage on the user device, the web server may extract one or more user features (e.g., location of the originating request to load the webpage) associated with the request from the user device to load the webpage. Various user features may be collected over time in a user profile.

The client system 130 may include a network of one or more servers and databases associated with a client (e.g., an entity, such as a company). In some implementations, the network within the client system 130 may include a web server that hosts one or more webpages or an application server that hosts a native application operated by or associated with the client. User device 140 may interact with the client system 130 by transmitting a communication to the web server of client system 130. For example, the communication may be a request to load a webpage onto a browser running on the user device 140. Similarly, user device 150 may transmit a communication to the client system 130 requesting to load the webpage on the browser of user device 150. It will be appreciated that any number of user devices and of any type of computing device (e.g., desktop computer, tablet computer, electronic kiosk, and so on) may communicate with client system 130.

In some implementations, client system 130 may define one or more workflows for communicating with user devices. A workflow may be an orchestrated sequence of one or more tasks. A task may include executable code that, upon execution by a server, causes client system 130 to transmit a communication to a user device over a communication channel. The content of the communication and the specific communication channel selected for transmitting the communication may be defined by the executable code of the task. For example, a task may be a marketing campaign designed to engage certain customers. The workflow orchestrates a sequence of one or more tasks for an individual user profile over the course of a defined time interval. Workflows may serve as effective at engaging users in relation to certain goods or services. As an illustrative example, client system 130 may store at least two workflows. A first workflow may include two tasks for user device 140, a second workflow may include three tasks for user device 150. The first workflow may include a first task of transmitting a communication to user device 140 using a text messaging communication channel at a first time and a second task of transmitting a communication to user device 140 using an email communication channel at a later second time. The second workflow may include a first task of transmitting a communication to user device 150 using an email communication channel at a first time, a second task of transmitting a communication to user device 150 using a social media communication channel at a later second time (e.g., by transmitting a message to a user's account using a social media platform), and a third task of transmitting a communication to user device 150 using another email communication channel at a later third time. The communication received at a user device may enable the user operating the user device to perform one or more actions. For example, the communication may include a selectable link. The user may select the link or may not select the link. When the user performs an action, client system 130 may detect the action because a signal may have been transmitted back (or the lack of receiving a signal within a defined time period) to client system 130. In some implementations, client system 130 may transmit a signal to cloud-based application 120 hosted on cloud network 110. The signal may include the response received from user devices in response to receiving communications. Continuing with the example above, client system 130 may transmit a signal to cloud-based application 120 when user device 140 responds to each of the first and second tasks, and similarly, when user device 150 responds to each of the first, second, and third tasks. In other implementations, cloud-based application 120 may execute the tasks of the workflow, instead of client system 130 performing the task execution.

In some implementations, client system 130 may generate one or more data sets of user profiles based on the interactions between the web server and the various user devices, such as user device 140 and user device 150. The user profiles may include data fields of feature values that are generated based on the user interactions (e.g., interactions by webpage visitors). Non-limiting examples of feature values may include IP address, location of user device, device type, browser type, user name (if detectable or known), actions performed, and other suitable features. To illustrate, one of the feature values may be represented by a data field associated with values that indicate whether the user is associated with a particular characteristic (e.g., is interested in a certain activity, such as sports). If, for example, the user operating user device 140 is associated with the particular characteristic, then a particular value may be stored at the data field included in the user profile. The value may indicate that the user is associated with the particular characteristic. Client system 130 may evaluate the user profiles (e.g., the first-party data collected by the client) to extract the user profiles that include the value indicating that the association with the particular characteristic (e.g., the user is interested in sports). Client system 130 may store as a first data set (e.g., an input list of user profiles) the extracted user profiles that are associated with the particular characteristic. For example, client system 130 may include the input list of user profiles into the first workflow, as described above. When a user profile is included in a workflow, client system 130 may transmit communications to user device(s) associated with the user profile, as part of executing the tasks of the workflow. When a user profile is not included in the workflow, client system 130 would not transmit communications to user device(s) associated with the user profiles that are not included in the workflow. Additionally, in some implementations, the client system 130 may also store other user profiles in a second data set (e.g., a candidate list of user profiles). The second data set may include any number of other user profiles (e.g., not included in the first data set), such as user profiles associated with users who are not associated with the particular characteristic, new user profiles for which there is a lack of data, user profiles associated with users who are anonymous, and other suitable user profiles. The second data set may include one or more user profiles that the client seeks to engage. The client, however, may increase an efficiency and/or success of user communication by interacting with cloud-based application 120, which is configured to intelligently select user profiles of the second data set for inclusion in the various workflows. Example processes for intelligently selecting user profiles for inclusion in a workflow are described herein (e.g., with respect to FIGS. 2-5).

Cloud-based application 120 may evaluate the various signals received from client system 130 representing the various responses of user devices included in the workflow that received communications, as part of executing the tasks. The responses of user devices in response to receiving communications may represent the performance of workflows. For example, if 30 percent of user devices that received a communication performed a particular action, then cloud-based application 120 may detect that 30 percent of user devices performed the particular action based on the signals received in real-time from client system 130. Further, cloud-based application 120 may be configured to perform one or more analytical functions using the user profiles included in the first and second data sets (which have been received from client system 130). In some implementations, cloud-based application 120 may perform a function that automatically and intelligently selects user profiles of the second data set for inclusion in the workflows based on the performance of the user profiles of the first data set (e.g., the performance of the user profiles that were included in the workflow). The intelligent selection of user profiles from the second data set may be based on results generated in response to performing a user modeling protocol. As a non-limiting example, the user modeling protocol may include one or more executable steps, including (1) identifying a first group of user profiles from the first data set (e.g., user profiles previously included in the workflow) for which a performance metric is above a threshold, (2) performing one or more techniques for determining user similarity between the group of user profiles and the new user profiles of the second data set, (3) identifying a second group of new user profiles that are similar to the first group of user profiles based on results of the user similarity determination, and (4) including the second group of user profiles in the workflow for coordinated engagement. The techniques for determining user similarity may include, for example, a random forest algorithm, a variable importance algorithm, statistical inference techniques, curve fitting, machine-learning techniques, unsupervised clustering techniques (e.g., k-means clustering, exclusive clustering, overlapping clustering, hierarchical clustering, and probabilistic clustering), audience selection techniques, supervised learning techniques, online or offline learning classification techniques, and other suitable user similarity matching. In some cases, user similarity may be based on transforming data fields of the user profiles into numerical values, for example, using feature decomposition techniques, such as singular value decomposition (SVD) and non-negative matrix factorization (NMF). The numerical values of the data fields of various user profiles may be plotted in a Euclidean or cosine space, and the similarity between two user profiles may be determined when the two user profiles are within a threshold distance in the Euclidean or cosine space. For an example of a user similarity determination technique, see U.S. Ser. No. 16/694,357, filed on Nov. 25, 2019, the disclosure of which is hereby incorporated by reference for all purposes.

In some implementations, a cloud-based application may perform a function that automatically detects which user profiles of the second data set are similar to one or more user profiles of a first data set. For example, performing the function may include executing a predictive feature selection technique that automatically identifies one or more data fields of the user profiles of the first data set that are predicted to have contributed to the performance of the target outcome. Non-limiting examples of the predictive feature selection technique may include a random forest algorithm, a variable importance algorithm, and other suitable feature selection techniques. The result of performing the predictive feature selection technique may include one or more data fields (e.g., user features) of data records (e.g., user profiles) that contributed to a user's performance of the target outcome. The cloud-based application may execute an unsupervised machine-learning-based clustering algorithm, such as, for example, k-means clustering, exclusive clustering, overlapping clustering, hierarchical clustering, and probabilistic clustering. The clustering operation may be based at least in part on the user features identified as a result of performing the predictive feature selection techniques. As an illustrative example, if the predictive feature selection technique identified two user features (e.g., geographical location and device type) that correlated with users performing the target outcome, then the clustering operation may be performed on the user profiles of the second data set based on the two user features. Further, the cloud-based application may standardize (e.g., transform) the user features of a user profile into an N-dimensional feature representation of the user profile using, for example, one or more feature decomposition techniques, such as singular value decomposition (SVD) and non-negative matrix factorization (NMF). The clustering operation may form one or more clusters of user profiles. For each cluster of the second data set and for the standardized user profiles of the first data set, the cloud-based application may aggregate the N-dimensional feature representations for the user profiles into a single vector that represents the user profiles of a cluster. Thus, for example, each cluster of the one or more clusters may be represented by a vector, and similarly, the first data set may be represented by a vector. The cloud-based application may compare the vectors of each cluster of the second data set with the vector representing the first data set. For example, the vector-to-vector comparison may be based on a Euclidean or cosine distance and a threshold distance. As an illustrative and non-limiting example, if the vector representing a cluster of the second data set is within a threshold distance of the vector representing the first data set, then the cloud-based application may determine that the user profiles included in the cluster of the second data set are similar to the user profiles of the first data set.

A similarity detection system may be any server or processor configured to determine which cluster of user profiles of the second data set are similar to the user profiles of the first data set. In some implementations, the similarity detection system may generate one or more vectors for the first data set and for each cluster of the one or more clusters of the second data set. The vector may be determined by aggregating the N-dimensional feature representation of the user profiles included in each cluster of user profiles. As an illustrative and non-limiting example, each user profile in a cluster may be represented by three feature values after the feature standardization performed by the feature selection system. The similarity detection system may compute an average (or any other combination) of the three feature values across the user profiles in the cluster to generate the vector that represents the cluster. The similarity detection system may then compare the vector of each cluster to the vector representing the first data set against a threshold. In some implementations, the comparison may be performed in a Euclidean or cosine space, and the distance between the vector representing the cluster and the vector representing the first data set may be computed. If the distance is within the threshold value, then the similarity detection system may determine that the user profiles included in the cluster are similar to the user profiles included in the first data set. As an advantage, the comparison performed by the similarity detection system increases the computational efficiency of the cloud-based application because the user similarity is determined on a group level, instead of on a user-to-user level.

A cloud-based application may compare each vector of a cluster with the vector representing the first data set. The comparison may be performed using a Euclidean or cosine space, for example. If a distance between the vector representing the cluster and the vector representing the first data set is below a threshold in, for example, the Euclidean or cosine space, then the cloud-based application may determine that the cluster of users is similar to the user profiles of the first data set. Advantageously, the vector-to-vector comparison performed efficiently compares two groups of user profiles together, which reduces processing burdens as compared to comparing on a user-to-user level.

A new data set including one or more clusters of user profiles for which the vector is within a threshold distance of the vector representing the first data set may be transmitted from the cloud-based application to a client system. In some implementations, when the client system originally requests that the first data set and the second data set be compared for similar user profiles, the request may include a number of user profiles that the client wants to receive. If the number of user profiles in the cluster that is determined to be most similar to the first data set (e.g., the vectors are the closest in a cosine space) is lower than the total number of user profiles requested, then the cloud-based application may identify the next most similar cluster to the first data set (e.g., the cluster for which the vector is next closest to the vector of the first data set in a cosine space) and include the user profiles of that cluster in the new data set, and so on until the total number of user profiles requested is reached.

The similarity detection system of the cloud-based application, for example, may compare the vector of each cluster to the vector representing the first data set in a space, such as a Euclidean space or a cosine space. If, for example, a vector is determined to be the closest vector to vector representing the first data set in a vector space, then the cloud-based application may determine that the corresponding cluster includes user profiles that are similar to the target user profiles of the first data set. As a technical advantage, the computational efficiency of the processors or servers of the cloud-based application is improved because, instead of performing user similarity determinations on a user-to-user level, the cloud-based application performs the user similarity determinations on a group-to-group level using a vector-to-vector comparison.

Figure 2:
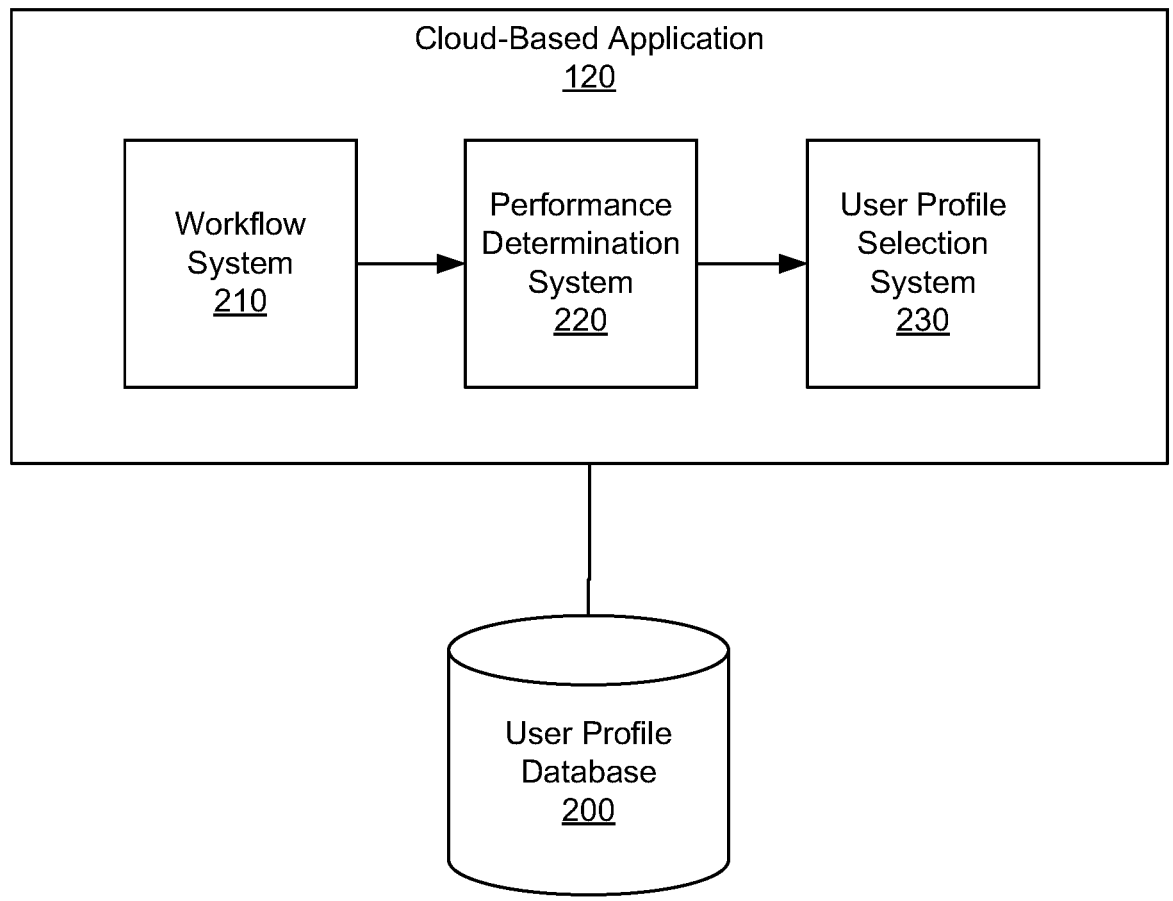
FIG. 2 is a block diagram illustrating another example of a network environment, according to some aspects of the present disclosure.

FIG. 2 is a block diagram illustrating an example of cloud network 110 for intelligently selecting user profiles to include in workflows, according to some aspects. Cloud-based application 120 may include a network of cloud-based servers and databases. In some implementations, the network of cloud-based application 120 may include workflow system 210, performance determination system 220, and user profile selection system 230. Further, in some implementations, the cloud-based application 120 may be configured to communicate with user profile database 200 to retrieve one or more user profile data sets. The user profile database 200 may be configured to store any number of data records, including one or more data sets of user profiles. For example, when the cloud-based application 120 receives the first and second data sets from the client system 130, as described in FIG. 1, the first and second data sets may be stored in the user profile database 200.

Workflow system 210 may be any server, processor and/or database configured to store and potentially execute workflows defined by various client systems. Storing a workflow may include storing the executable code of each task in an orchestrated sequence, along with a time of executing the various tasks. In some implementations, the client systems, such as client system 130, may execute the workflow and transmit the user responses to the engagement performed by the tasks of the workflow to cloud-based application. In this case, the responses received from the various client systems may be stored within or accessible by workflow system 210. In other implementations, cloud-based application 120 may execute the various workflows and receive the response signals (indicating the actions performed by the user devices) directly from user devices. In this case, the workflows and the corresponding tasks may be stored within or may be accessible by workflow system 210.

Performance determination system 220 may be any server, processor and/or database configured to define and collect performance metrics from the user devices associated with the user profiles included in the workflow. In some implementations, performance metrics may include a score or value associated with an action of the one or more actions. For example, a target action, such as selecting a link, may be assigned a highest value, and other non-target actions, such as opening a browser window but not selecting a particular link, may be assigned lower values (or vice versa). The performance metrics of a user profile may be based on the action(s) performed by the user associated with the user profile in response to receiving the communication transmitted as a result of executing a task of a workflow. It will be appreciated that performance metrics may be defined as any suitable ranking or scoring mechanism, such that the performance metrics represent whether or not to a degree to which a user performed a target action. The target action may be user defined in advance of the workflow being initially executed.

User profile selection system 230 may be any server, processor and/or database configured to intelligently select new user profiles for inclusion in a workflow based on the performance metrics of the user profiles that were previously included in the workflow. For example, user profile selection system 230 may be configured to receive the performance metrics generated over a time interval (e.g., one hour, one day, one week, and so on) for the user profiles included in the workflow. For example, user profile selection system 230 may compare the performance metrics of the user profiles against a threshold value. The threshold value may be defined automatically or based on user input. Performance metrics that meet or exceed the threshold value may indicate the best performing user profiles during the time interval. For example, the user profiles associated with the performance metrics that meet or exceed the threshold value may correspond to users who performed a predefined target action during the time interval (e.g., selected the link included in the communication). In some implementations, a performance metric may be an indication of which action the user performed when the user device received the communication. A threshold may be a target action. Thus, user profile selection system 230 may determine that user profiles for which the users performed the target action may have satisfied the threshold.

It will be appreciated that the action may not necessary be an action associated with a link included in the communication. The user device may receive a communication with a link, but the user may access a webpage independently to purchase a good or service. Even though the target action may be the selection of the link, the purchasing of the good or service may nonetheless be considered the target action, in cases for example, where the link may have navigated the user to a webpage that enabled the user to purchase the good or service.

User profile selection system 230 may identify the best performing user profile that were previously included in the workflow (e.g., the user profiles with the performance metrics that met or exceeded the threshold value) and store those user profiles in a data set. For example, if a first set of user profiles were previously included in the workflow, user profile selection system 230 may evaluate the performance metrics of the first set of user profiles against a threshold and may select a first subset of the first set of user profiles. The first subset of user profiles may be users who performed the target action. User profile selection system 230 may perform a user modeling protocol to intelligently select new user profiles (that have not yet been included in the workflow) for inclusion in the workflow during the next time interval. For example, user profile selection system 230 may compare the first subset of users (and the corresponding user features) with the new user profiles included in the second data set to identify which new user profiles are determined to be similar to the user profiles of the first subset.

In some implementations, performing the user modeling protocol may include executing an unsupervised learning clustering operation, such as, for example, k-means clustering, exclusive clustering, overlapping clustering, hierarchical clustering, and probabilistic clustering. User profile selection system 230 may perform clustering on the user profiles of the second data set (e.g., the new user profiles that have not previously been included in the workflow). The clustering may also be performed based on the data fields of the user profiles in the second data set. The clustering operation may yield one or more clusters of user profiles of the second data set. In some implementations, user profile selection system 230 may not perform clustering on the user profiles of the first subset. In other implementations, user profile selection system 230 may cluster the user profiles of the first subset. User profile selection system 230 may then compare the user features of the first subset against the user features of each formed cluster of user profiles. A result of the comparison may detect similar user profiles between the first subset and the new users of the second data set. In some implementation, user profile selection system 230 may perform statistical inference techniques (e.g., curve fitting) to detect similar user profiles between the first subset of user profiles and the new user profiles of the second data set. In some implementations, user profile selection system 230 may perform a supervised learning classification of the new user profiles into various groups, such as a group that is predicted to perform a target action in response to receiving the communication or a group that is predicted to not perform the target action. It will be appreciated that the present disclosure is not limited to the examples of techniques for determining similar user profiles described above. Thus, it will be appreciated that any suitable audience selection technique may be executed by user profile selection system 230 to identify user profiles of the second data set that are similar to the user profiles of the first subset. As a technical advantage, the cloud-based application 120 may perform the user similarity determination in a computationally efficient manner by executing the user modeling protocol, such as unsupervised machine-learning techniques, to identify or predict which new user profiles correspond to new users who are likely to perform a target action. Once the new user profiles that are predicted to satisfy the performance threshold are selected from the second data set, cloud-based application 120 may include the new user profiles in the workflow for the next time interval. Cloud-based application 120 may begin collecting the performance metrics of the new user profiles when the next time interval begins.

Figure 3:
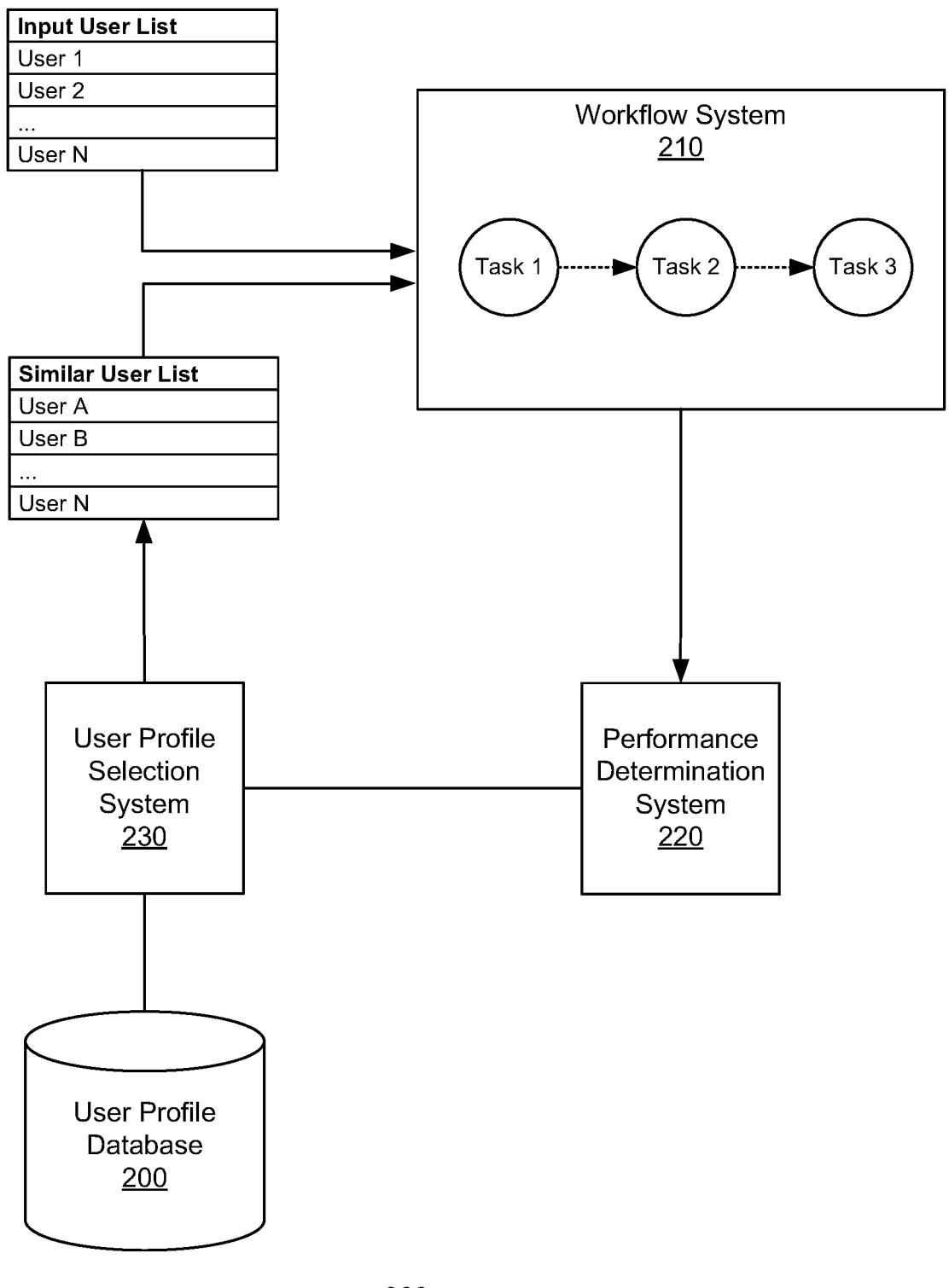
FIG. 3 illustrates an example of a process flow for intelligently selecting users to include in a workflow, according to some aspects of the present disclosure.

FIG. 3 is a diagram illustrating an example of a process flow 300 for selecting user profiles to include in a workflow, according to some aspects of the present disclosure. Process flow 300 may be performed, at least in part, by any component described in FIGS. 1-2, for example. Further, process flow 300 may be performed to intelligently select new user profiles for inclusion in a workflow. The new user profiles may be selected from a set of user profiles that have not yet been included in the workflow. In some examples, the new user profiles selected for inclusion in the workflow may be selected based on a prediction of whether or the new users associated with the new user profiles would perform one or more target actions.

Process flow 300 begins with an input user list being inputted into workflow system 210. In this example, workflow system 210 may execute the workflow in association with the input user list. It will be appreciated, however, that a client system, such as client system 130, may execute the workflow, instead of workflow system 210. The input user list may be determined based on any number of factors and may be of any user. The user list includes user profiles for user 1, user 2, through user N. The input user list may be inputted into workflow system 210, which enables the input user list to be included in the workflow. Including a user profile into a workflow means that a user device associated with the user profile may receive a communication in response to executing a task of the workflow. For example, workflow system 210 may include a workflow including task 1, task 2, and task 3. Task 1, task 2, and task 3 may be an orchestrated sequence of tasks that amount to a workflow. Each task may be designed to engage one or more users.

Executing task 1 may include generating a communication and transmitting the communication to each user included in the input user list. For example, transmitting a communication may include transmitting the communication to a user device, such as a text message. As another example, transmitting the communication to the user included in the input user list may include transmitting an email to an email address included the user profile. Performance determination system 220 may determine the performance of each user profile included in the input user list. The performance may be a performance metric calculated over a time interval. For example, the performance of a user profile may include whether or not the user associated with the user profile performed a target action in response to receiving a communication that was generated and transmitted as a result of executing a task of the workflow. Once the time interval has expired and performance determination system 220 has generated a performance metric for each user of the input user list, user profile selection system 230 may evaluate the performance metrics to intelligently select new user profiles to include in the workflow.

User profile selection system 230 may receive the performance metrics for the input user list and select a subset of the input user list based on the performance metrics. For example, the performance metrics may be compared against a threshold. The threshold may be a target action. User profile selection system 230 may identify which users of the input list of users performed the target action (e.g., selecting a link) in response to receiving a communication as part of a task being executed. User profile selection system 230 may then select the subset of the input user list based on the users who satisfy the threshold and/or based on the users who performed the target action.

Additionally, user profile selection system 230 may access a set of new user profiles, which have not yet been included in the workflow, or which are eligible for being included in the workflow (even if the user profile has previously been included in the workflow). The new user profiles may have been received from a client system or may be stored in user profile database 200. User profile selection system 230 may compare the selected subset of the input user list to the set of new user profiles. User profile selection system 230 may perform a user modeling protocol to detect which new user profiles of the set of new user profiles are similar to the selected subset of users of the input user list. Non-limiting examples of the user modeling protocol may include a user profile-to-user profile comparison based on user features, a comparison of users based on a statistical inference technique, a classification or segmentation of users based on unsupervised clustering techniques (e.g., k-means clustering), or other suitable audience selection techniques. User profile selection system 230 may then select a subset of the set of new user profiles based on the result(s) of executing the user modeling protocol. The subset of the set of new user profiles may then be transmitted back to workflow system 210 by inputting the "similar user list" into workflow system 210. The similar user list may be the subset of the set of new user profiles that are determined to be similar to the selected subset of the input user list. For example, user A, user B, through user N may be intelligently selected from a set of new user profiles based on a prediction that the users of the similar user list may also perform the target action. Thus, the selection of the similar user list intelligently expands on the input user list in a manner that is computationally efficient and predictive of success (e.g., predictive of new users performing the target action in response to receiving the communication). At the beginning of the next time interval, task 1, task 2, and task 3 may be executed in association with the users included in the "similar user list." In some implementations, the intelligent selection of new user profiles may be continuously performed for each time interval. In some implementations, executing the workflow leads to a continuous learning process that results in the enhanced performance of the workflow until a termination condition is satisfied (e.g., a saturation is achieved in improvements relating to the target action, such as a rate of users selecting a link).

It will be appreciated that, in some implementations, the similar user list may be evaluated using one or more exclusionary rules. If a user profile of the similar user list does not satisfy an original condition for generating the input user list, then the user profile may be excluded from the similar user list. As an illustrative example, an original condition for the input user list may be that users located in California are to be excluded from being included in the workflow. Cloud-based application 120 may evaluate the similar user list using the one or more exclusionary rules to detect whether any new user profiles of the similar user list indicate that the associated users live in California. If so, then cloud-based application 120 may exclude those users from the similar user list, even though those users were determined to be similar to the first subset of user profiles.

FIGS. 4A-4B are examples of different workflow, according to some aspects of the present disclosure. FIG. 4A may illustrate the example of workflow 400A. Workflow 400A may include a plurality of tasks, including task 1, task 2, task 3, task 4, and task 5. Tasks 1 through 5 may be related to the extent that the sequence of tasks is orchestrated for individual users. For example, tasks 1 through 5 may be designed to engage with individual users. As an illustrative example, task 1 may include executable code that, upon execution, generates a first communication (e.g., a text message) and transmits the first communication to a user device over a first communication channel at a first time (e.g., SMS text messaging). Task 2 may include executable code that, upon execution, generates a second communication (e.g., an email) and transmits the second communication to the user device over a second communication channel at a later second time (e.g., over the Internet). Based on the actions performed by users receiving the second communication, either task 3 or task 5 may be performed for the user. If the user who received the second communication performs a certain action (e.g., selecting a link), then task 3 may be executed. Task 3 may include executable code that, upon execution, generates a third communication (e.g., another email) and transmits the third communication to the user device over a third communication channel at a later third time (e.g., over the Internet). Then, for these users, task 4 may be executed at a later fourth time. Task 4 may include executable code that, upon execution, generates a fourth communication (e.g., a push notification on a native application running on the user device) and transmits the fourth communication to the user device over a fourth communication channel at a later fourth time. For users who performed a different action in response to receiving the second communication of Task 2, task 5 may be performed. For example, task 5 may include triggering a phone call to the user device so that an agent can communicate with the user.

FIG. 4B may illustrate the example of workflow 400B. Workflow 400B may include a plurality of tasks, including task 1, task 2, task 3, task 4, task 5, task 6, and task 7. Tasks 1 through 7 may be orchestrated and designed to engage with individual users (e.g., for the purpose of interacting with the user) in a manner that is likely to achieve a successful outcome (e.g., the purchasing of a good or service). As an illustrative example, similar to workflow 200B, task 1 may be executed at a first time and task 2 may be performed at a later second time. Dependent on the user's response to the second communication of Task 2, one of task 3, task 5, or task 6 may be performed. If task 3 is performed for a user, then at a later time task 4 may be performed. If either of task 5 or 6 is performed for the user, task 7 may be executed at a later time.

Figure 5:
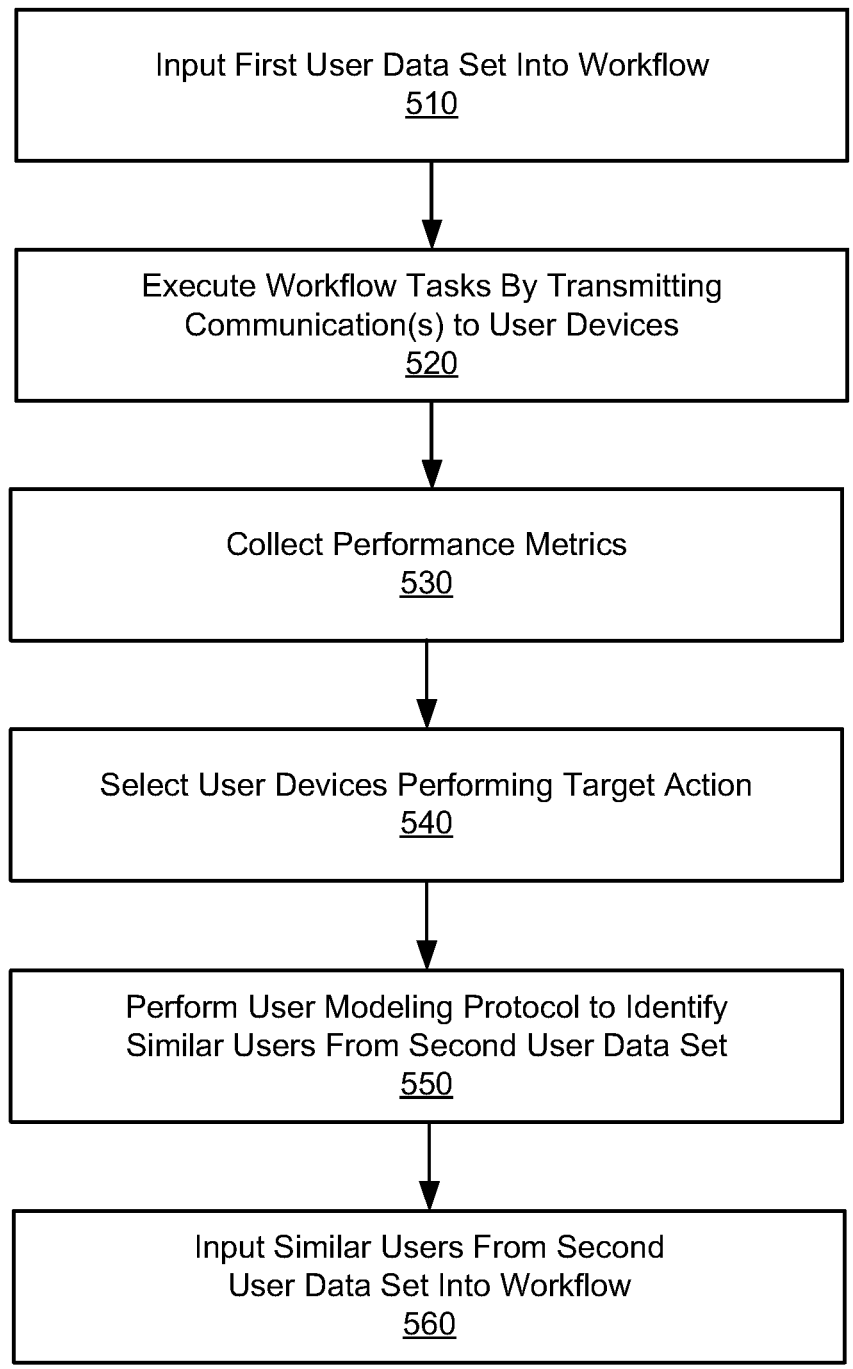
FIG. 5 is a flowchart illustrating an example process for automatically and intelligently selecting new users for including into a workflow, according to some aspects of the present disclosure.

FIG. 5 is a flowchart illustrating an example of process 500 for automatically and intelligently selecting new users for including into a workflow, according to some aspects of the present disclosure. In some implementations, process 500 may be performed by any component described in FIGS. 1-2. For example, process 500 may be performed by cloud-based application 120 and any of the corresponding sub-components. Further, as a non-limiting example, process 500 may be performed to intelligently and selectively expand on the audience that is subject to a workflow, which includes a plurality of tasks that are coordinated in a sequence for individual users.

For example, process 500 may begin at block 510, where client system 130 inputs a first user data set into a workflow. The first user data set may be an input user list. Further, inputting the input user list into the workflow may mean that the users included in the input user list may be subject to receiving communications as part of the tasks of the workflow. It will be appreciated that the cloud-based application 120 may also input the input user list into the workflow. The input user list may be an initial list of users that satisfy an initial condition, such as the users are known users who are interested in a certain activity, such as sports. The input user list is often difficult to determine and is often manually created. Certain embodiments, however, enable the automatic and intelligent expansion of the input user list to users who are predicted to perform a target action.

At block 520, the client system 130 may execute the tasks of the workflow in the coordinated manner in which the tasks are configured within the workflow. Executing a workflow task may include generating a communication (e.g., the content of a message, including a link) and transmitting the communication to a user device included in the workflow.

At block 530, cloud-based application 120 may collect performance metrics for the user profiles included in the workflow. For example, cloud-based application 120 may receive a signal in real-time as a user performs an action after having received a communication resulting from executing a task of the workflow. A lack of receiving a signal at cloud-based application may also be informative for determining performance metrics. For example, if cloud-based application 120 does not receive a signal indicating that the user selected a link included in the communication within a certain time, then cloud-based application 120 may determine that the user did not select the link as use this information in generating the performance metrics for the user. In some implementations, the performance metrics calculated for each user in the input user list may be based on whether or not the user performed a target action. A user who performed the target action may have a higher performance metric than a user who did not perform the target action.

At block 540, cloud-based application 120 may select the user profiles that did perform the target action. In some implementation, cloud-based application 120 may select a subset of the input user list, based on the performance metrics that met or exceeded a threshold. In some implementations, cloud-based application 120 may select a subset of the input user list, such that the selected subset of users performed a target action.

At block 550, cloud-based application 120 may perform a user modeling protocol to identify new user profiles that are similar to the subset of users who performed the target action. For example, cloud-based application 120 may perform a statistical interference technique between the subset of user profiles and a second user data set of new user profiles that have not yet been included in the workflow. As another example, cloud-based application 120 may perform unsupervised clustering techniques (e.g., k-means clustering) to form clusters of the new user profiles. The cluster of user profiles can be compared against user profiles of the selected subset of the input user list to determine whether the cluster is similar to the subset of the input user list.

At block 560, the new user profiles that are determined to be similar to the selected subset of the input user list may be included in the workflow at the next time interval. A task of the workflow may be executed, which may generate and transmit a communication to the new user profiles that are determined to be similar to the selected input user list.

Figure 6:
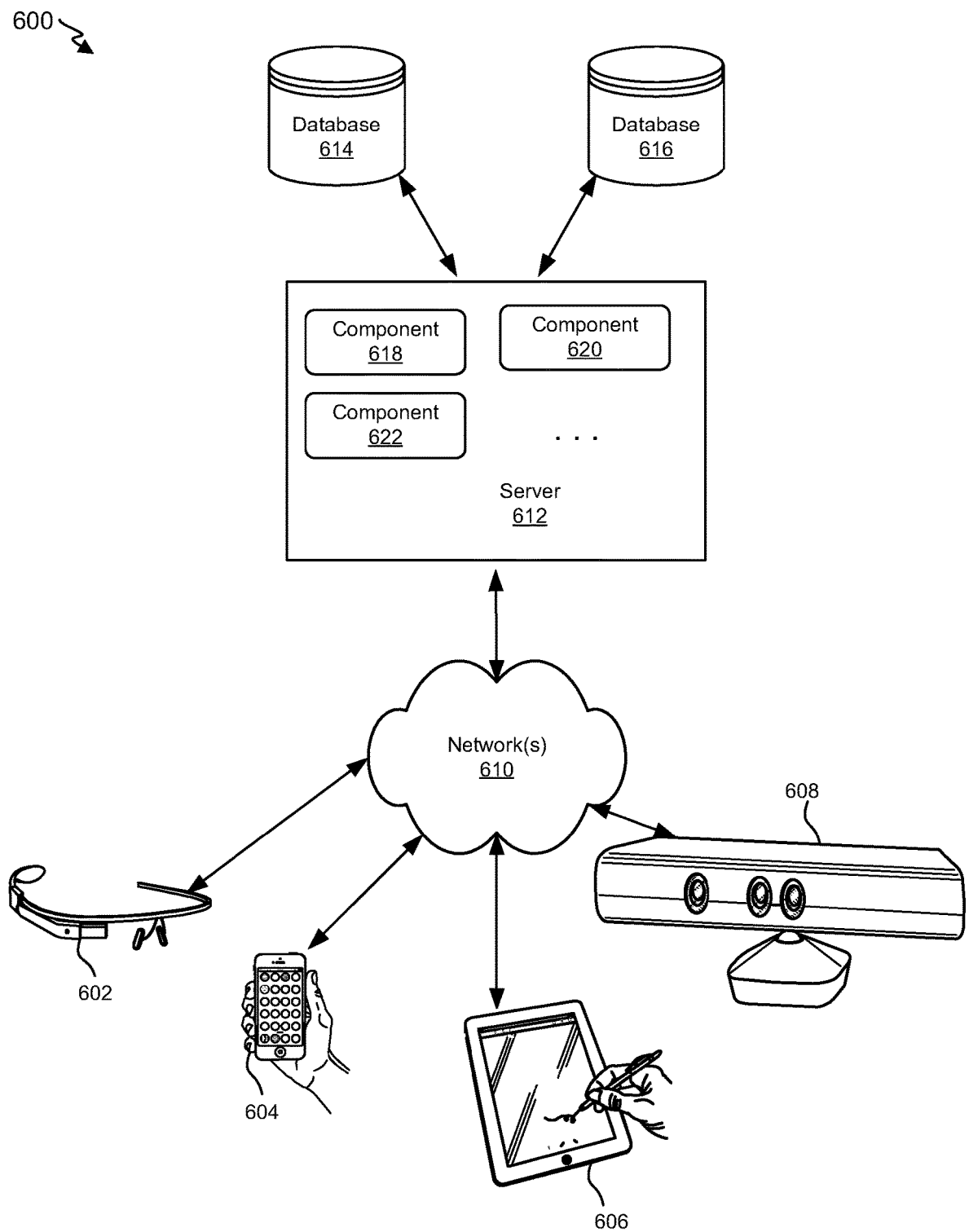
FIG. 6 is a simplified diagram illustrating a distributed system for implementing one of the embodiments.

FIG. 6 depicts a simplified diagram of a distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
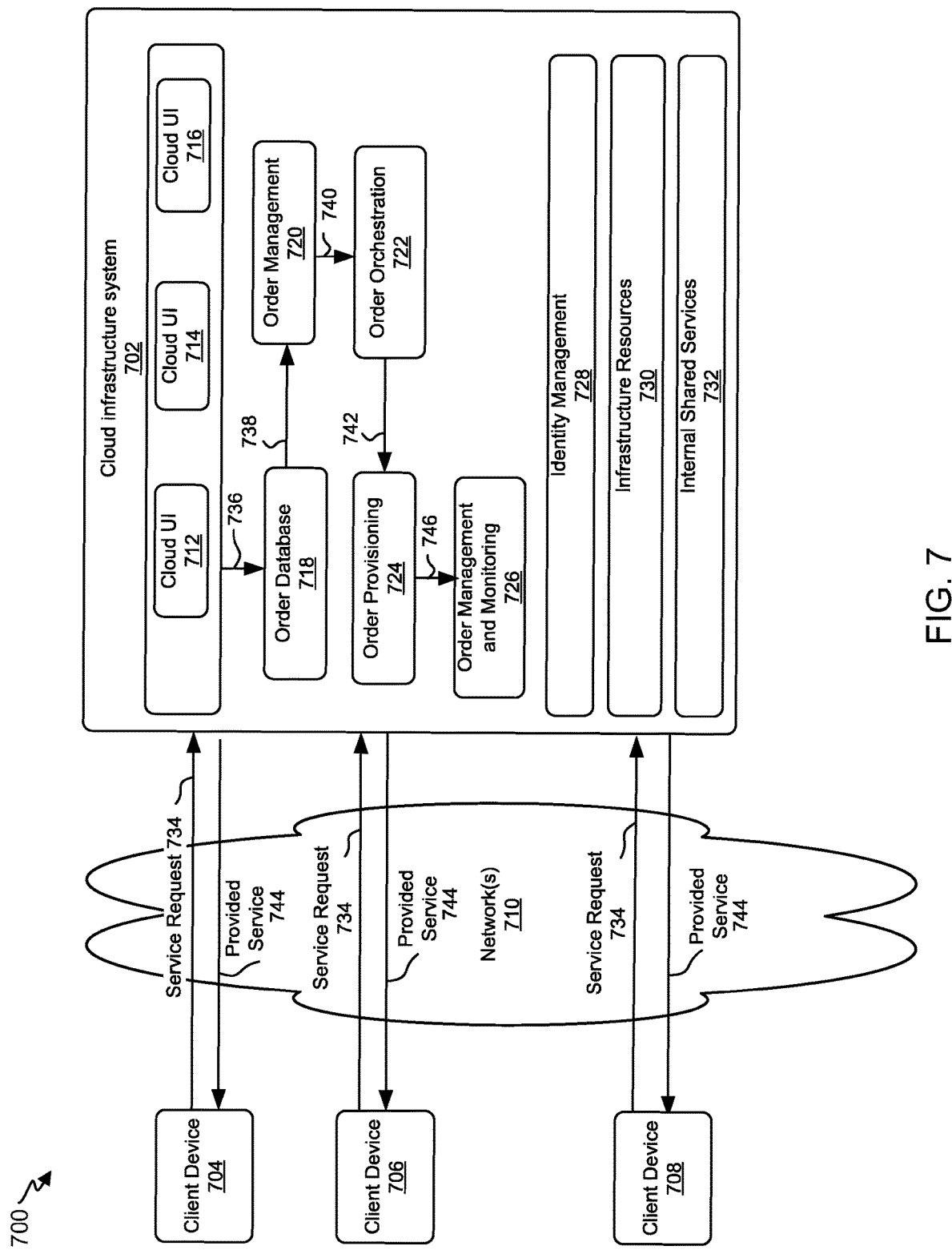
FIG. 7 is a simplified block diagram illustrating one or more components of a system environment.

FIG. 7 is a simplified block diagram of one or more components of a system environment 700 by which services provided by one or more components of an embodiment system may be offered as cloud services, in accordance with an embodiment of the present disclosure. In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

Cloud infrastructure system 702 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 802 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 718 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of processes associated with each order and applies logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 700 may include an identity management module 728. Identity management module 728 may be configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
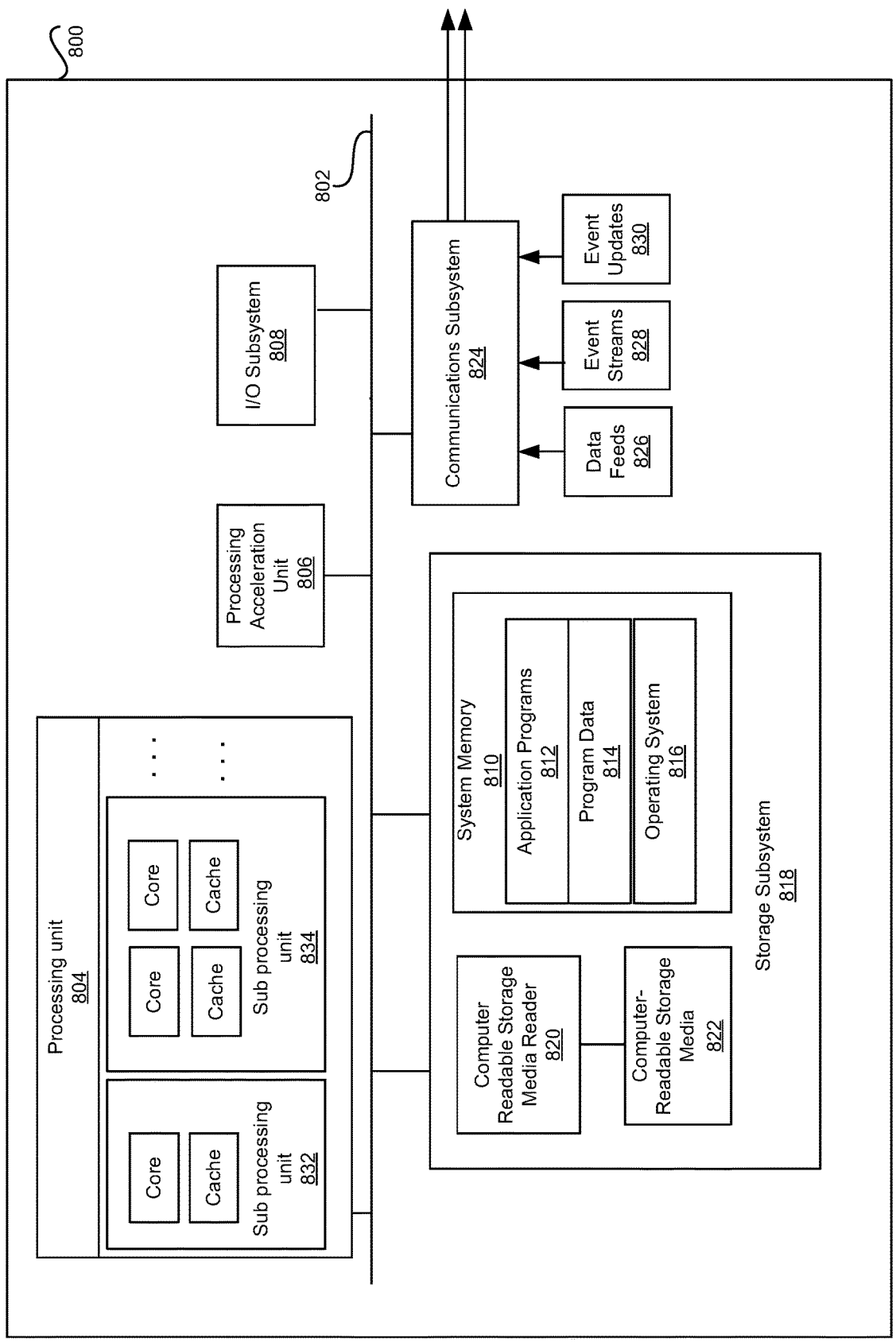
FIG. 8 illustrates an exemplary computer system, in which various embodiments of the present invention may be implemented.

FIG. 8 illustrates an exemplary computer system 800, in which various embodiments of the present invention may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 924 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
accessing a first user data set associated with a first set of user profiles representing a first set of user devices and a second user data set associated with a second set of user profiles representing a second set of user devices;
executing a workflow orchestrated to include one or more tasks to be performed on the first user data set, wherein executing the workflow comprises:
inputting the first user data set into the workflow, each task of the one or more tasks including transmitting a communication to a user device, and the workflow being configured to execute the one or more tasks in a sequence;
executing the one or more tasks of the workflow in association with the first set of user devices, the execution including transmitting the communication to each user device of the first set of user devices, wherein receiving the communication at a user device enables the user device to perform one or more actions;

receiving one or more performance metrics associated with the execution of the one or more tasks of the workflow during a time period, each performance metric of the one or more performance metrics indicating an action of the one or more actions performed by a user device in response to receiving the communication;

automatically selecting a first subset of user devices from the first set of user devices, the selection of the first subset of user devices being based on the one or more performance metrics associated with the first set of user profiles associated with the first set of user devices, wherein the one or more performance metrics associated with the first set of user profiles associated with the first set of user devices indicate that the first set of user devices took a particular action of the one or more actions;

using an unsupervised machine learning model of the first user data set and the one or more performance metrics to predict, from the second set of user devices, a second subset of user devices that are likely to take the particular action, wherein using the unsupervised machine learning model of the first user data set and the one or more performance metrics to predict, from the second set of user devices, the second subset of user devices that are likely to take the particular action comprises:

performing a clustering operation on the second user data set associated with the second set of user profiles representing the second set of user devices, the clustering operation generating one or more clusters of user devices of the second set of user devices;

generating, for each cluster of the one or more clusters, a cluster vector representing the one or more devices included in the cluster;

generating one or more target vectors representing the first subset of user devices;

determining a vector-to-vector similarity between the one or more target vectors and each cluster vector of the one or more cluster vectors; and selecting the second subset of user devices from the second set of user devices based at least in part on the vector-to-vector similarity between the one or more target vectors and the cluster vectors of the second subset of user devices, wherein at least one user device of the second subset of user devices is not included in the first set of user devices;

continuing to execute the workflow that was orchestrated to include the one or more tasks performed on the first user data set by:

automatically transmitting at least a portion of the second user data set into the workflow, the portion of the second user data set corresponding to the second subset of user devices;

executing the one or more tasks of the workflow in association with the second subset of user devices, the execution of the one or more tasks including transmitting the communication to each user device of the second subset of user devices;

receiving one or more second performance metrics associated with, the execution of the one or more tasks of the workflow in association with, the second subset of user devices, each second performance metric of the one or more second performance metrics indicating a second action of one or more second actions performed by a second user device of the second subset of user devices in response to receiving the communication;

automatically identifying an additional subset of user devices from, the second subset of user devices, wherein each user device in the subset of user devices is associated with a performance metric above a threshold;

updating the unsupervised machine learning model using data corresponding to the additional subset of user devices to prioritize detecting other user devices likely to take the particular action; and continuing to execute the workflow that was orchestrated to include the one or more tasks performed on the first user data set by automatically transmitting a new user data set into the workflow using the updated unsupervised machine learning model until a termination condition is satisfied.

2. The computer-implemented method of claim 1, wherein using an unsupervised machine learning model of the first user data set and the one or more performance metrics to predict, from the second set of user devices, the second subset of user devices that are likely to take the particular action further comprises executing one or more audience lookalike techniques.

3. The computer-implemented method of claim 1, wherein using an unsupervised machine learning model of the first user data set and the one or more performance metrics to predict, from the second set of user devices, the second subset of user devices that are likely to take the particular action further comprises:

executing a statistical inference technique to evaluate the first subset of the first set of user devices and the second set of user devices, the execution of the statistical inference technique resulting in a determining of one or more user devices of the second set of user devices that are similar to at least one user device of the first subset.

4. The computer-implemented method of claim 1, wherein the one or more tasks of the workflow are not executed in association with the second set of user devices during the time period.

5. The computer-implemented method of claim 1, wherein the automatic selection of the first subset includes selecting a user device into the first subset when the user device performed a target action of the one or more actions in response to receiving the communication.

6. The computer-implemented method of claim 1, wherein the first user data set includes a plurality of first user records, each first user record of the plurality of first user records includes one or more user features characterizing a first user device of the first set of user devices, wherein the second user data set includes a plurality of second user records, each second user record of the plurality of second user records includes one or more user features characterizing a second user device of the second set of user devices.

7. The computer-implemented method of claim 1, wherein performing the clustering operation includes using k-means clustering.

8. A system, comprising:
one or more data processors; and
a non-transitory computer-readable storage medium containing instructions which, when executed on the one or more data processors, cause the one or more data processors to perform operations including:
accessing a first user data set associated with a first set of user profiles representing a first set of user devices and a second user data set associated with a second set of user profiles representing a second set of user devices;

executing a workflow orchestrated to include one or more tasks to be performed on the first user data set, wherein executing the workflow comprises:

inputting the first user data set into the workflow, each task of the one or more tasks including transmitting a communication to a user device, and the workflow being configured to execute the one or more tasks in a sequence;

executing the one or more tasks of the workflow in association with the first set of user devices, the execution including transmitting the communication to each user device of the first set of user devices;

receiving one or more performance metrics associated with the execution of the one or more tasks of the workflow during a time period, each performance metric of the one or more performance metrics indicating an action of the one or more actions performed by a user device in response to receiving the communication;

automatically selecting a first subset of user devices from the first set of user devices, the selection of the first subset of user devices being based on the one or more performance metrics associated with the first set of user profiles associated with the first set of user devices, wherein the one or more performance metrics associated with the first set of user profiles associated with the first set of user devices indicate that the first set of user devices took a particular action of the one or more actions;

using an unsupervised machine learning model of the first user data set and the one or more performance metrics to predict, from the second set of user devices, a second subset of user devices that are likely to take the particular action, wherein using the unsupervised machine learning model of the first user data set and the one or more performance metrics to predict, from the second set of user devices, the second subset of user devices that are likely to take the particular action comprises:

performing a clustering operation on the second user data set associated with the second set of user profiles representing the second set of user devices, the clustering operation generating one or more clusters of user devices of the second set of user devices;

generating, for each cluster of the one or more clusters, a cluster vector representing the one or more devices included in the cluster;

generating one or more target vectors representing the first subset of user devices;

determining a vector-to-vector similarity between the one or more target vectors and each cluster vector of the one or more cluster vectors; and selecting the second subset of user devices from the second set of user devices based at least in part on the vector-to-vector similarity between the one or more target vectors and the cluster vectors of the second subset of user devices, wherein at least one user device of the second subset of user devices is not included in the first set of user devices;

continuing to execute the workflow that was orchestrated to include the one or more tasks performed on the first user data set by:

automatically transmitting at least a portion of the second user data set into the workflow, the portion of the second user data set corresponding to the second subset of user devices;

executing the one or more tasks of the workflow in association with the second subset of user devices, the execution of the one or more tasks including transmitting the communication to each user device of the second subset of user devices, receiving one or more second performance metrics associated with the execution of the one or more tasks of the workflow in association with the second subset of user devices, each second performance metric of the one or more second performance metrics indicating a second action of one or more second actions performed by a second user device of the second subset of user devices in response to receiving the communication;

automatically identifying an additional subset of user devices from the second subset of user devices;

updating the unsupervised machine learning model using data corresponding to the additional subset of user devices to prioritize detecting other user devices likely to take the particular action; and continuing to execute the workflow that was orchestrated to include the one or more tasks performed on the first user data set by automatically transmitting a new user data set into the workflow using the updated unsupervised machine learning model until a termination condition is satisfied.

9. The system of claim 8, wherein using an unsupervised machine learning model of the first user data set and the one or more performance metrics to predict, from the second set of user devices, the second subset of user devices that are likely to take the particular action further comprises executing one or more audience lookalike techniques.

10. The system of claim 8, wherein using an unsupervised machine learning model of the first user data set and the one or more performance metrics to predict, from the second set of user devices, the second subset of user devices that are likely to take the particular action further comprises:

executing a statistical inference technique to evaluate the first subset of the first set of user devices and the second set of user devices, the execution of the statistical inference technique resulting in a determining of one or more user devices of the second set of user devices that are similar to at least one user device of the first subset.

11. The system of claim 8, wherein the one or more tasks of the workflow are not executed in association with the second set of user devices during the time period.

12. The system of claim 8, wherein the automatic selection of the first subset includes selecting a user device into the first subset when the user device performed a target action of the one or more actions in response to receiving the communication.

13. The system of claim 8, wherein the first user data set includes a plurality of first user records, each first user record of the plurality of first user records includes one or more user features characterizing a first user device of the first set of user devices, wherein the second user data set includes a plurality of second user records, each second user record of the plurality of second user records includes one or more user features characterizing a second user device of the second set of user devices.

14. A computer-program product tangibly embodied in a non-transitory machine-readable storage medium, including instructions configured to cause a data processing apparatus to perform operations including:
accessing a first user data set associated with a first set of user profiles representing a first set of user devices and a second user data set associated with a second set of user profiles representing a second set of user devices;
executing a workflow orchestrated to include one or more tasks to be performed on the first user data set, wherein executing the workflow comprises:
inputting the first user data set into the workflow, each task of the one or more tasks including transmitting a communication to a user device, and the workflow being configured to execute the one or more tasks in a sequence;
executing the one or more tasks of the workflow in association with the first set of user devices, the execution including transmitting the communication to each user device of the first set of user devices, wherein receiving the communication at a user device enables the user device to perform one or more actions;
receiving one or more performance metrics associated with the execution of the one or more tasks of the workflow during a time period, each performance metric of the one or more performance metrics indicating an action of the one or more actions performed by a user device in response to receiving the communication;
automatically selecting a first subset of user devices from the first set of user devices, the selection of the first subset of user devices being based on the one or more performance metrics associated with the first set of user profiles associated with the first set of user devices, wherein the one or more performance metrics associated with the first set of user profiles associated with the first set of user devices indicate that the first set of user devices took a particular action of the one or more actions;
using an unsupervised machine learning model of the first user data set and the one or more performance metrics to predict, from the second set of user devices, a second subset of user devices that are likely to take the particular action, wherein using the unsupervised machine learning model of the first user data set and the one or more performance metrics to predict, from the second set of user devices, the second subset of user devices that are likely to take the particular action comprises:
performing a clustering operation on the second user data set associated with the second set of user profiles representing the second set of user devices, the clustering operation generating one or more clusters of user devices of the second set of user devices;
generating, for each cluster of the one or more clusters, a cluster vector representing the one or more devices included in the cluster;
generating one or more target vectors representing the first subset of user devices;
determining a vector-to-vector similarity between the one or more target vectors and each cluster vector of the one or more cluster vectors; and
selecting the second subset of user devices from the second set of user devices based at least in part on the vector-to-vector similarity between the one or more target vectors and the cluster vectors of the second subset of user devices, wherein at least one user device of the second subset of user devices is not included in the first set of user devices;
continuing to execute the workflow that was orchestrated to include the one or more tasks performed on the first user data set by:
automatically transmitting at least a portion of the second user data set into the workflow, the portion of the second user data set corresponding to the second subset of user devices;
executing the one or more tasks of the workflow in association with the second subset of user devices, the execution of the one or more tasks including transmitting the communication to each user device of the second subset of user devices,
receiving one or more second performance metrics associated with, the execution of the one or more tasks of the workflow in association with, the second subset of user devices, each second performance metric of the one or more second performance metrics indicating a second action of one or more second actions performed by a second user device of the second subset of user devices in response to receiving the communication;
automatically identifying an additional subset of user devices from, the second subset of user devices, wherein each user device in the subset of user devices is associated with a performance metric above a threshold;
updating the unsupervised machine learning model using data corresponding to the additional subset of user devices to prioritize detecting other user devices likely to take the particular action; and
continuing to execute the workflow that was orchestrated to include the one or more tasks performed on the first user data set by automatically transmitting a new user data set into the workflow using the updated unsupervised machine learning model until a termination condition is satisfied.

15. The non-transitory machine-readable storage medium of claim 14, wherein using an unsupervised machine learning model of the first user data set and the one or more performance metrics to predict, from the second set of user devices, the second subset of user devices that are likely to take the particular action further comprises executing one or more audience lookalike techniques.

16. The non-transitory machine-readable storage medium of claim 14, wherein using an unsupervised machine learning model of the first user data set and the one or more performance metrics to predict, from the second set of user devices, the second subset of user devices that are likely to take the particular action further comprises:
executing a statistical inference technique to evaluate the first subset of the first set of user devices and the second set of user devices, the execution of the statistical inference technique resulting in a determining of one or more user devices of the second set of user devices that are similar to at least one user device of the first subset.

17. The non-transitory machine-readable storage medium of claim 14, wherein the one or more tasks of the workflow are not executed in association with the second set of user devices during the time period.

18. The non-transitory machine-readable storage medium of claim 14, wherein the automatic selection of the first subset includes selecting a user device into the first subset when the user device performed a target action of the one or more actions in response to receiving the communication.

* * * * *

UNITED STATES PATENT AND TRADEMARK OFFICE
CERTIFICATE OF CORRECTION

PATENT NO. : 12,001,984 B2
APPLICATION NO. : 16/728701
DATED : June 4, 2024
INVENTOR(S) : Boddu et al.

It is certified that error appears in the above-identified patent and that said Letters Patent is hereby corrected as shown below:

In the Claims

In Column 29, Line 62, in Claim 1, delete "with," and insert -- with --, therefor.

In Column 29, Line 63, in Claim 1, delete "with," and insert -- with --, therefor.

In Column 30, Line 4, in Claim 1, delete "from," and insert -- from --, therefor.

In Column 34, Line 25, in Claim 14, delete "with," and insert -- with --, therefor.

In Column 34, Line 26, in Claim 14, delete "with," and insert -- with --, therefor.

In Column 34, Line 35, in Claim 14, delete "from," and insert -- from --, therefor.

Signed and Sealed this
First Day of October, 2024

Katherine Kelly Vidal
*Director of the United States Patent and Trademark Office*